United States Patent
Ueda et al.

(10) Patent No.: US 8,489,266 B2
(45) Date of Patent: Jul. 16, 2013

(54) VEHICLE POWER SYSTEM

(75) Inventors: Nobumasa Ueda, Nagoya (JP); Naoki Yamamoto, Aichi-ken (JP); Yuji Hayashi, Kasugai (JP); Yuuki Tsutsu, Kariya (JP); Takuto Suzuki, Okazaki (JP)

(73) Assignee: Denso Corporation, Kariya (JP)

( * ) Notice: Subject to any disclaimer, the term of this patent is extended or adjusted under 35 U.S.C. 154(b) by 256 days.

(21) Appl. No.: 13/050,122

(22) Filed: Mar. 17, 2011

(65) Prior Publication Data

US 2011/0231042 A1 Sep. 22, 2011

(30) Foreign Application Priority Data

Mar. 18, 2010 (JP) ................................. 2010-062151

(51) Int. Cl.
*B60L 9/00* (2006.01)
(52) U.S. Cl.
USPC ............................. 701/22; 320/162; 320/150
(58) Field of Classification Search
USPC 320/162, 150, 163, 109, 135, 104; 290/40 C; 701/22, 102; 180/65.265, 65.275, 65.21; 477/5, 477/7; 370/10.1; 219/497
See application file for complete search history.

(56) References Cited

U.S. PATENT DOCUMENTS

| | | | |
|---|---|---|---|
| 2003/0001544 A1* | 1/2003 | Nakanishi | 320/162 |
| 2004/0066094 A1 | 4/2004 | Suzuki et al. | |
| 2004/0145186 A1* | 7/2004 | Inokuchi et al. | 290/40 C |
| 2006/0132100 A1* | 6/2006 | Tsubone | 320/150 |
| 2010/0094498 A1* | 4/2010 | Watanabe et al. | 701/22 |

FOREIGN PATENT DOCUMENTS

| | | |
|---|---|---|
| JP | 7-164982 | 6/1995 |
| JP | 8-5124 | 1/1996 |
| JP | 2001-17619 | 1/2001 |
| JP | 2003-3889 | 1/2003 |
| JP | P2003-118511 A | 4/2003 |
| JP | 3594566 | 9/2004 |
| JP | 3825020 | 7/2006 |

OTHER PUBLICATIONS

Japanese Office Action dated Apr. 3, 2012, issued in corresponding Japanese Application No. 2010-062151 with English Translation.

* cited by examiner

*Primary Examiner* — Behrang Badii
(74) *Attorney, Agent, or Firm* — Nixon & Vanderhye PC

(57) ABSTRACT

A vehicle power system is provided with a switching power supply that generates an operation power for operating a plurality of ECU by stepping down a power supply supplied from at least one of a generator and a battery, and a power distributor that distributes and supplies the operation power generated by the switching power supply to the individual ECUs.

24 Claims, 7 Drawing Sheets

VEHICLE POWER SYSTEM

CROSS-REFERENCE TO RELATED APPLICATION

This application is based on and claims the benefit of priority from earlier Japanese Patent Application No. 2010-062151 filed Mar. 18, 2010, the description of which is incorporated herein by reference.

TECHNICAL FIELD

The present disclosure relates to a vehicle power system including a generator for generating electricity being driven by an engine and including a battery charged by the generator, which system supplies power to various electrical loads installed in the vehicle from at least either one of the generator and the battery.

BACKGROUND

This type of vehicle power system in the conventional art supplies power to individual ECUs (electronic control units) from at least either one of a generator and a battery, as disclosed in JP-A-2003-003889, via a protective function, such as a fuse or a fusible link, and a power-distribution function, such as a relay. Each of the ECUs is provided therein with a power circuit to individually generate a power-supply voltage required in the ECU.

However, being provided with a power circuit in each of the ECUs, the size of individual ECUs is unavoidably increased in the above vehicle power system of the conventional art. Thus, the vehicle power system of the conventional art has suffered from a problem of requiring a large space for arranging the ECUs.

SUMMARY

An embodiment provides a vehicle power system which is able to reduce the size of each of the ECUs.

In a vehicle power system according to a first aspect, the vehicle power system includes a generator driven by an engine for generating electricity, and a battery charged by the generator.

The vehicle power system supplies power to various electrical loads installed in the vehicle from at least either one of the generator and the batter.

The vehicle power system further includes a first power generating unit that generates a first operation power for operating a plurality of ECUs as first electrical loads by stepping down an original power supplied from at least either one of the generator and the battery, and a first power distributor that distributes and supplies a first operation power generated by the first power generating unit to individual ECUs.

Thus, the first power distributor is able to distribute and supply the first operation power to the ECUs. Specifically, power circuits of the ECUs are integrated into a single component without providing power circuits in the respective ECUs. Accordingly, the size of each of the ECUs is reduced by that much.

In the vehicle power system according to a second aspect, the vehicle power system further includes a first current sensing circuit and a first communication circuit provided in the first power generating unit, a second current sensing circuit, a second communication circuit, and a first current control circuit provided in the first power distributor, a third current sensing circuit, a third communication circuit, and a second current control circuit provided in the individual ECUs, respectively, and a in-vehicle communication line that connects between the first, the second, and the third communication circuits.

The first current sensing circuit detects a first output current value that is a magnitude of an output current of the first power generating unit, the second current sensing circuit detects a second output current value that is a magnitude of an output current of the first power distributor, and the third current sensing circuit detects a consumption current value that is a magnitude of a consumption current of the individual ECUs.

The first communication circuit transmits the first output current value detected by the first current sensing circuit via the in-vehicle communication line, and receives the second output current value transmitted by the second communication circuit and the consumption current value transmitted by the third communication circuit.

The second communication circuit transmits the second output current value detected by the second current sensing circuit via the in-vehicle communication line, and receives the first output current value transmitted by the first communication circuit and the consumption current value transmitted by the third communication circuit.

The third communication circuit transmits the consumption current value detected by the third current sensing circuit via the in-vehicle communication line, and receives the first output current value transmitted by the first communication circuit and the second output current value transmitted by the second communication circuit.

The first current control circuit controls the output current of the first power distributor to become small when the first output current value received by the second communication circuit exceeds a set threshold, and the second current control circuit reduces the consumption current when at least one of the first output current value and the second output current value received by the third communication circuit exceeds a set threshold corresponding to each value.

Thus, when the output current value of the first power generating unit or the first power distributor exceeds the threshold, or when the consumption current value of the ECUs exceeds the threshold, the output current of the first power distributor or the consumption current of the ECUs is controlled to be a low level.

Accordingly, control is performed such that the output current of the first power generating unit or the first power distributor as well as the consumption current of the ECUs will not exceed the threshold.

In the vehicle power system according to a third aspect, the first power distributor provides individual ECUs a shut-off circuit that disconnects an electric circuit outputting the output current when the output current to the particular ECU becomes abnormal.

Thus, disconnection of the electric circuit can prevent the breakage of the particular ECU, which breakage would have otherwise been caused by the abnormal output current.

In the vehicle power system according to a fourth aspect, the first power distributor provides individual ECUs a shut-off circuit that disconnects an electric circuit outputting the output current when the output current to the particular ECU becomes abnormal, and the first power distributor is configured to disconnect the output current to the particular ECU by operating the shut-off circuit connected to the particular ECU when the output current to the particular ECU becomes abnormal even when the second current control circuit controls the second output current to become small.

Thus, once the output current supplied from the first power distributor to a particular ECU becomes abnormal, the output current in question is stopped, irrespective of the fact that the output current is in the process of being controlled to a low level.

Thus, for example, breakage of the particular ECU is prevented, which would have otherwise been caused by the abnormal output current.

In the vehicle power system according to a fifth aspect, a communication speed of the in-vehicle communication line is 500 Kbps or more.

Thus, the output current of the first power generating unit and the first power distributor as well as the consumption current of the ECUs is controlled on a real-time basis. For example, using the communication protocol of a communication standard called CAN® (controller area network), a communication speed of 500 Kbps or more is achieved.

In the vehicle power system according to a sixth aspect, a communication using the in-vehicle communication line is performed based on the communication standard called LVDS (low-voltage differential signaling).

Since the communication is performed based on the communication standard called LVDS, higher-speed multiplex communication is ensured, whereby the output current and the consumption current are further controlled on a real-time basis.

In the vehicle power system according to a seventh aspect, the first power generating unit is a switching power supply.

Thus, since the power loss of the first power generating unit is reduced, the load of the generator is reduced. Accordingly, fuel consumption is improved. Also, supply of high voltage is cut off, which would be caused when, for example, a battery is disconnected or when an engine is jump-started in cold climates by serially connecting a plurality of batteries. Thus, the ECUs are allowed to have a lower withstand voltage which is lower by an amount equivalent to the cutoff of the supply of high voltage, thereby further reducing the size of each of the ECUs.

In the vehicle power system according to an eighth aspect, the switching power supply is an insulated switching power supply.

When a battery having high open-circuit voltage is used, the chassis ground of the vehicle cannot be used. In this regard, use of the insulated switching power supply as a switching power supply enables supply of the first operation power to the ECUs without the necessity of using the chassis ground of the vehicle.

In the vehicle power system according to a ninth aspect, the switching power supply is a non-insulated switching power supply.

Thus, the first operation power is supplied from the non-insulated switching power supply to the ECUs. Accordingly, the size of the power supply can be reduced and the power circuit can be provided at low cost, compared to the case where power is supplied from an insulated switching power supply.

In the vehicle power system according to a tenth aspect, the first power generating unit generates the first operation power of 5.5 to 6.5V.

In the case where an individual ECU has a simplified power supply with an output transistor being configured by an NPN transistor, voltage drop of the power supply may be about 1.2 to 1.5 V. On the other hand, if a configuration of using an NPN transistor or a P-channel MOS transistor as an output transistor is used, voltage drop is suppressed to about 0.3 to 0.5 V.

In this regard, as described above, each of the ECUs is supplied with the first operation power of 5.5 to 6.5. Therefore, in the event the voltage drop mentioned above occurs in the course of supplying the operation power, an operating voltage of 5 V is ensured for each of the ECUs.

In the vehicle power system according to an eleventh aspect, the vehicle power system further includes a second power generating unit that generates a second operation power to operate a plurality of second electrical loads by stepping up an original power, and a second power distributor that distributes and supplies the second operation power generated by the second power generating unit to each second electrical load.

Thus, the second power distributor can distribute and supply the second operation power to the second electrical loads. Specifically, power circuits of the second electrical loads can be integrated into a single component without the necessity of providing a power circuit to each of the second electrical loads. Accordingly, the size of each of the second electrical loads is reduced by that much.

In the vehicle power system according to a twelfth aspect, the second power generating unit is an insulated switching power supply, the first power generating unit is a non-insulated switching power supply that has the first insulated switching power supply as a primary power supply, and the first power distributor distributes and supplies the first operation power generated by the non-insulated switching power supply to the individual ECUs.

Thus, the first operation power can be supplied from the non-insulated switching power supply to the ECUs. Therefore, the size of the power supply is reduced and the power circuit is provided at low cost compared to the case where operation power is supplied from an insulated switching power supply.

In the vehicle power system according to a thirteenth aspect, the vehicle power system further includes a series power supply that supplies an operation power to a microcomputer installed in the particular ECU while a battery charge is stopped.

Thus, the microcomputer provided at the particular ECU can be operated even when battery charge is stopped. Also, the battery is prevented from being consumed due to the operation of the particular ECU while the battery charge is stopped.

In the vehicle power system according to a fourteenth aspect, the second power generating unit is an insulated switching power supply, the vehicle power system is provided with a battery for auxiliary devices, which is connected to an output side of the insulated switching power supply, for operating auxiliary devices, and a series power supply having the first battery for the auxiliary devices as a primary side that supplies an operation power to a microcomputer installed in the particular ECU when the generator is not driven.

Thus, when the battery having high open-circuit voltage is used, power is supplied to the auxiliary devices from the battery for auxiliary devices (hereinafter referred to as "auxiliary battery") connected to the output side of the insulated switching power supply. Also, since a series power supply is charged by the auxiliary battery, operation power to be supplied to a microcomputer is unlikely to be insufficient when the generator is brought into an un-driven state.

In the vehicle power system according to a fifteenth aspect, the second power generating unit is a switching power supply.

Thus, power loss of the second power generating unit is reduced to thereby reduce the load of the generator. As a result, fuel consumption is improved. Also, supply of high voltage is cut off, which would be caused when, for example, a battery is disconnected or when an engine is jump-started in cold climates by serially connecting a plurality of batteries.

Thus, the ECUs are allowed to have a lower withstand voltage which is lower by an amount equivalent to the cutoff of the supply of high voltage, thereby further reducing the size of each of the ECUs.

In the vehicle power system according to a sixteenth aspect, the switching power supply is an insulated switching power supply.

When a battery having high open-circuit voltage is used, the chassis ground of the vehicle cannot be used. In this regard, use of the insulated switching power supply as a switching power supply enables supply of the second operation power to the second electrical loads without the necessity of using the chassis ground of the vehicle.

In the vehicle power system according to a seventeenth aspect, the switching power supply is a non-insulated switching power supply.

Thus, the second operation power can be supplied from the non-insulated switching power supply to the second electrical loads. Therefore, the size of the power supply is reduced and the power circuit is provided at low cost compared to the case where operation power is supplied from an insulated switching power supply.

In the vehicle power system according to an eighteenth aspect, the second power generating unit generates the second operation power of 8 to 16V.

Thus, the second power distributor is able to distribute and supply the second operation power of 8 to 16 V to the second electrical loads. Specifically, power circuits of the second electrical loads that operate at 8 to 16 V are integrated into a single component without the necessity of providing a power circuit to each of the second electrical loads. Therefore, the size of each of the second electrical loads is reduced accordingly.

In the vehicle power system according to a nineteenth aspect, the second power generating unit generates the second operation power of 18 to 42V.

Thus, the second power distributor is able to distribute and supply the second operation power of 18 to 42 V to the second electrical loads. Specifically, power circuits of the second electrical loads that operate at 18 to 42 V are integrated into a single component without the necessity of providing a power circuit to each of the second electrical loads. Therefore, the size of each of the second electrical loads is reduced by that much.

In the vehicle power system according to a twentieth aspect, the vehicle power system further includes a third power distributor that distributes and supplies the original power directly to a plurality of third electrical loads.

Thus, the third power distributor is able to directly distribute and supply the original power to the third electrical loads. Specifically, power circuits of the third electrical loads are integrated into a single component without the necessity of providing a power circuit to each of the third electrical loads. Therefore, the size of each of the third electrical loads is reduced by that much.

In the vehicle power system according to a twenty-first aspect, an open-circuit voltage of the battery is 100 V or more.

When the open-circuit voltage of the battery is 100 V or more, the chassis ground of the vehicle cannot be used. In this regard, use of the insulated switching power supply as a switching power supply enables supply of operation power to the electrical loads without the necessity of using the chassis ground of the vehicle.

In the vehicle power system according to a twenty-second aspect, the vehicle power system is constituted with the power line for the electrical loads whose noise level is large is separated from the power line for the electrical loads whose noise level is small, and the original power is supplied directly to the power line for the electrical loads whose noise level is large.

Thus, the noise caused by the electrical loads whose noise level is large is barely allowed to enter the power line for the electrical loads whose noise level is small.

In the vehicle power system according to a twenty-third aspect, the electrical loads whose noise level is large include at least one of an igniter, a starter motor, a blower motor for driving a blower fan of an air conditioner, a wiper motor for driving wipers and a radiator fan motor for driving a radiator fan, for example.

In the vehicle power system according to a twenty-fourth aspect, the battery is a lithium-ion battery.

Thus, using such a lithium-ion battery whose internal resistance is low, the original power of low noise level can be supplied to the first power generating unit.

In the vehicle power system according to a twenty-fifth aspect, the first power generating unit and the first power distributor are accommodated in a case where a plurality of the ECUs are accommodated.

Thus, the first power generating unit, the first power distributor and a plurality of ECUs are collectively arranged in a single housing. Therefore, the space for arranging the ECUs is reduced in addition to reducing the size of the ECUs.

DETAILED DESCRIPTION OF THE PREFERRED EMBODIMENTS

With reference to the accompanying drawings, hereinafter are described several embodiments of a vehicle power system of the present disclosure.

(First Embodiment)

Figure 1:
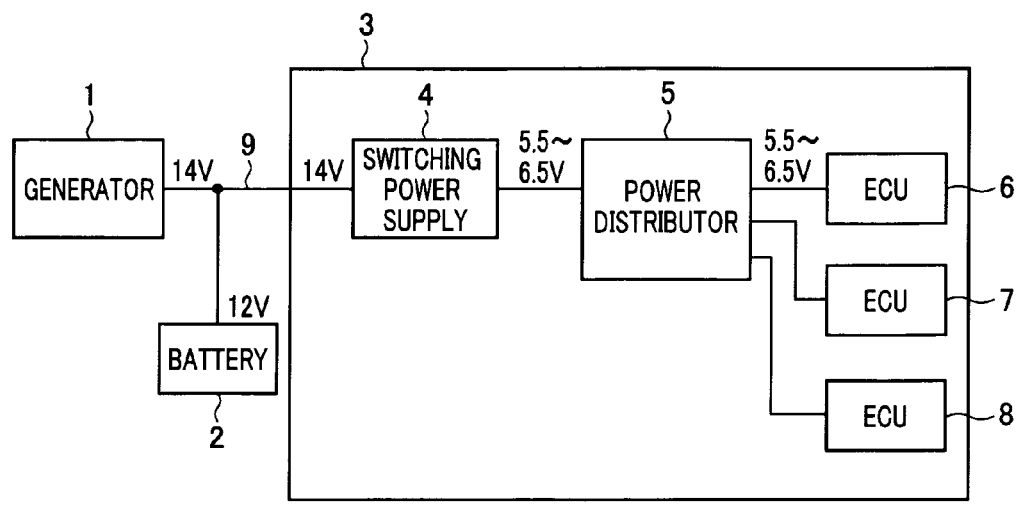
FIG. 1 is a block diagram illustrating a principal configuration of a vehicle power system according to a first embodiment of the present disclosure.

First, referring to FIG. 1, a first embodiment of the present disclosure is described. FIG. 1 is a block diagram illustrating a principal configuration of a vehicle power system according to the first embodiment.

The vehicle power system shown in FIG. 1 includes a generator 1 and a battery 2. The generator 1 installed in the vehicle generates power being driven by an engine. The generator 1 is an alternator, for example, that generates AC current and integrally provided with a regulator that converts the generated AC current into DC current of 14 V. The battery 2 is a lead battery having an open-circuit voltage of 12 V and charged by the generator 1. The regulator mentioned above has a function of monitoring the generated voltage of the generator 1 and regulating the excitation current of the generator 1 so that the charging voltage will have an appropriate value.

The vehicle power system also includes a power line 9 and a housing 3. The housing 3 includes a step-down switching power supply 4, a power distributor 5, and ECUs (electronic control units) 6 to 8. The power line 9 is connected to the generator 1 and the battery 2. The step-down switching power supply 4 has a power input which is also connected to the power line 9. The power distributor 5 has a power input connected to a power output of the switching power supply 4. The ECUs 6 to 8, which are operated at 5 V, have power inputs connected to respective power outputs of the power distributor 5. The switching power supply 4 steps down DC power of 14 V supplied from the generator 1 to generate operation power of 5.5 to 6.5 V for operating the plurality of ECUs 6 to 8 as electrical loads. For example, the switching power supply 4 is a known DC/DC converter that feeds back DC output voltage.

The power distributor 5 distributes the operation power generated by the switching power supply 4 to the ECUs 6 to 8. Specifically, power circuits of the ECUs 6 to 8 are integrated into the power distributor 5 as a single component. Also, the power distributor 5 has an electric circuit that supplies output current as the operation power to the ECUs 6 to 8, the electric circuit being interposed by semiconductor relays (not shown). When the output current supplied to a particular ECU from the power distributor 5 is abnormal, the semiconductor relay (corresponding to the shut-off circuit recited in claim 3) corresponding to the particular ECU is operated to disconnect the, electric circuit in which the semiconductor relay is disposed. Thus, the particular ECU is ensured not to be broken. Alternative to the semiconductor relays, mechanically operated relays, fuses, fusible links, and the like may be used.

The ECUs 6 to 8 can be selected from among the ECUs whose wiring distance from an ECU in question to an object to be controlled can be shortened. For example, the ECUs 6 to 8 can be selected from among the ECUs that control a body system. The ECUs that control the body system include those ECUs which control so-called event-driven units which are mainly operated with the manipulation of the occupants or with the execution of a computer program. Specifically, such ECUs include an air conditioner ECU that controls an air conditioner, a door ECU that controls a door-lock system, a power window ECU that controls power windows, a door mirror ECU that controls electrically-driven door mirrors, a power seat ECU that controls power seats, a roof ECU that controls opening/closing of a sun roof, a steering wheel switch ECU that controls input/output of signals from various switches arranged at a steering wheel, and an overhead ECU that controls input/output of signals from various switches arranged at an overhead console.

The number of ECUs accommodated in the housing 3 to receive first operation power from the power distributor 5 may be two, or four or more.

The switching power supply 4 and the power distributor 5 correspond to the vehicle power system of the present embodiment.

According to the vehicle power system of the first embodiment, the advantages as set forth below are obtained.

(1) Use of the vehicle power system of the first embodiment enables integration of the power circuits of the plurality of ECUs 6 to 8 into a single component. Accordingly, the power circuits can be omitted from the respective ECUs to thereby reduce the size and weight of the ECUs.

(2) When the output current from the power distributor 5 to a particular ECU is abnormal, the electric circuit for the abnormal output current is disconnected. For example, disconnection of the electrical circuit can prevent the breakage of the particular ECU, which breakage would have otherwise been caused by the abnormal output current. In addition, owing to the disconnection, the vehicle system as a whole is unlikely to be shut down due, for example, to the malfunction of the object to be controlled by the particular ECU or to a jammed harness.

(3) Since the operation power of the ECUs 6 to 8 is generated by the switching power supply 4, power loss is reduced compared to the use of a series power supply. As a result, the load of the generator 1 is reduced and thus fuel consumption is improved.

(4) When an engine is started, a large voltage fluctuation is caused because the starter makes the battery discharge high current. Also, when the battery is disconnected, high voltage called giant pulse may be supplied. Further, high voltage may also be supplied when an engine is jump-started in cold climates by serially connecting a plurality of batteries. To cope with the supply of high voltage, the conventional art has used, in each of ECUs, a semiconductor element normally having a withstand voltage of 35 to 40 V or an electrolytic capacitor having a withstand voltage of 25 to 35 V.

In this regard, however, the switching power supply 4 provided in the vehicle power system of the first embodiment is able to smooth the voltage fluctuation and cut supply of high voltage. Also, the switching power supply 4 has high switching speed for the generator 1, and therefore is able to abruptly supply electric charges in the event of occurring load fluctuation. Accordingly, the withstand voltage such as of the above semiconductor element or the electrolytic capacitor can be reduced. For example, the withstand voltage of 40 V of an element can be reduced to as low as 24 V to thereby reduce the on-resistance of a power element. As a result, the cost incurred in providing the ECUs is reduced and power loss of the ECUs is also reduced.

(5) In the conventional art, giving abrupt instructions concerning voltage to the generator to improve fuel consumption while fuel is injected according to the traveling conditions, has sometimes caused flickering of the headlights or variation in the operating speed of the wipers.

In this regard, the vehicle power system according to the first embodiment increases the degree of freedom in setting a primary-side voltage owing to the addition of the switching power supply 4. Accordingly, the headlights will not be flickered or the operating speed of the wipers will not be varied if abrupt instructions concerning voltage are given to the generator.

(6) In the case where an individual ECU has a simplified power supply with an output transistor being configured by an NPN transistor, voltage drop of the power supply may be about 1.2 to 1.5 V. On the other hand, if a configuration of using an NPN transistor or a P-channel MOS transistor as an output transistor is used, voltage drop is suppressed to about 0.3 to 0.5 V.

In this regard, in the first embodiment described above, each of the ECUs 6 to 8 is supplied with an operation power of 5.5 to 6.5 V. Therefore, in the event the voltage drop mentioned above occurs in the course of supplying the operation power, an operating voltage of 1 to 5 V, for example, is ensured which is required for a microcomputer or a logic IC provided in each of the ECUs 6 to 8.

(7) In the first embodiment, the switching power supply 4, the power distributor 5 and the ECUs 6 to 8 are collectively arranged in the single housing 3. Accordingly, the space for arranging the ECUs is reduced in addition to reducing the size of each of the ECUs.

(Second Embodiment)

Figure 2:
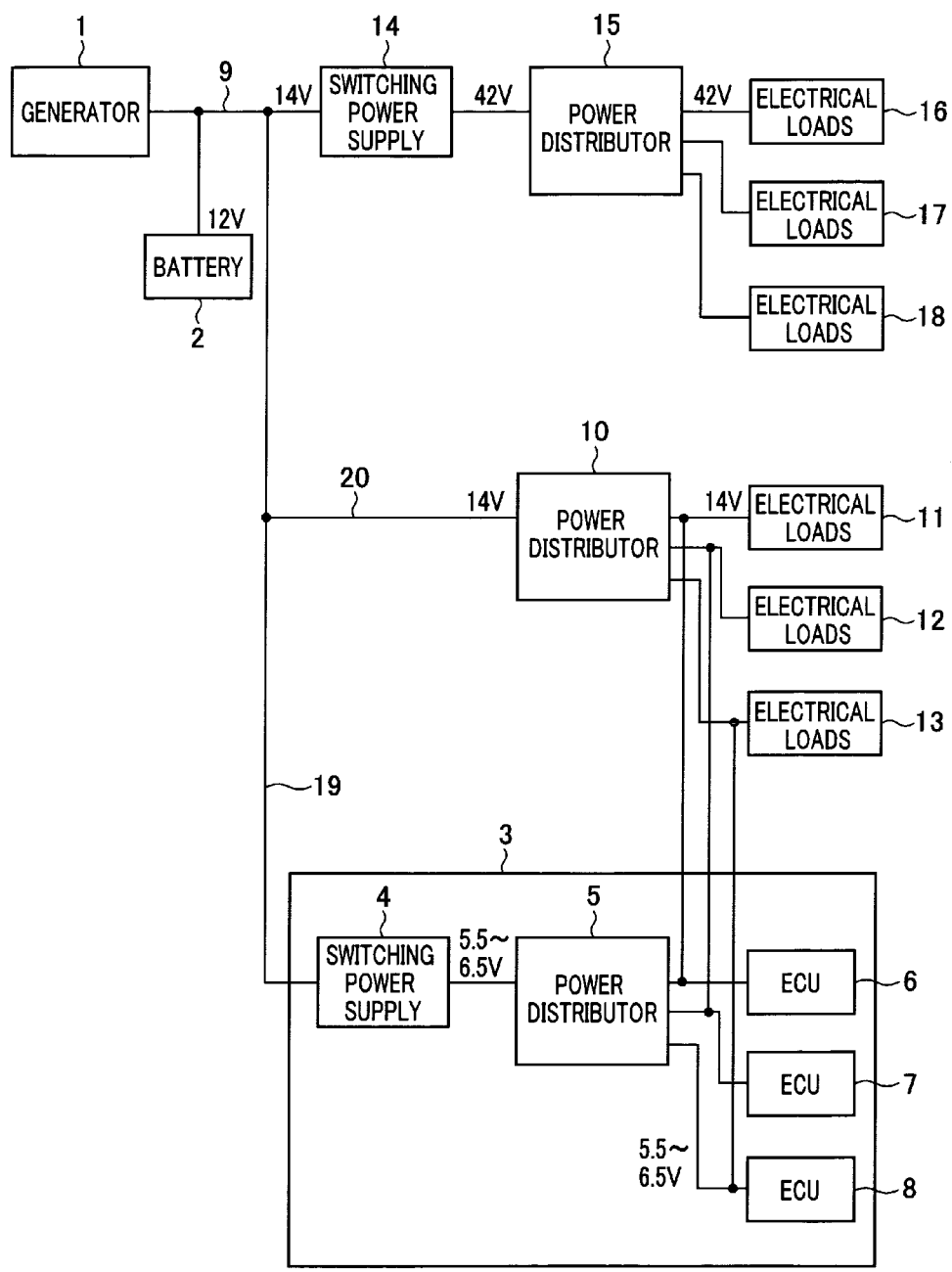
FIG. 2 is a block diagram illustrating a principal configuration of a vehicle power system according to a second embodiment of the present disclosure.

Referring now to FIG. 2, hereinafter is described a second embodiment of the present disclosure. In the second and the subsequent embodiments, the components identical with or similar to those in the preceding embodiments are given the same reference numerals for the sake of omitting explanation.

FIG. 2 is a block diagram illustrating a principal configuration of a vehicle power system according to the second embodiment.

The vehicle power system according to the second embodiment includes a step-up switching power supply 14, power distributors 15, 10 and electrical loads 11 to 13 and to 18, in addition to the components of the first embodiment.

The power line 9 is branched into power lines 19 and 20. The power line 19 is connected to the power input of the switching power supply 4. The power line 20 is connected to a power input of the power distributor 10. The power distributor 10 has power outputs connected to power inputs of the respective electrical loads 11 to 13 which are driven at 14 V DC. The power distributor 10 distributes and supplies DC power of 14 V supplied, from the power lines 9 and 20 to the electrical loads 11 to 13. Specifically, power circuits of the electrical loads 11 to 13 are integrated into the power distributor 10 as a single component. The electrical loads 11 to 13 may, for example, be the various meters arranged such as in an instrument panel of the vehicle, an audio system and a navigation system.

The power line 9 is connected to a power input of the step-up switching power supply 14. The switching power supply 14 has a power output connected to a power input of the power distributor 15. The power distributor 15 has power outputs connected to power inputs of the respective electrical loads 16 to 18 which are driven at 42 V. The switching power supply 14 steps up the DC power of 14 V supplied from the generator 1 to 42 V to generate an operation power of 42 V for operating the electrical loads 16 to 18. The switching power supply 14 may, for example, be a known DC/DC converter.

The power distributor 15 distributes and supplies the operation power of 42 V generated by the switching power supply 14 to the electrical loads 16 to 18. Specifically, power circuits of the electrical loads 16 to 18 are integrated into the power distributor 15 as a single component. Also, the power distributor 15 has an electric circuit that supplies output current as an operation power to the ECUs 16 to 18, the electric circuit being interposed by semiconductor relays (not shown). When the output current supplied to a particular electrical load from the power distributor 15 is abnormal, the semiconductor relay corresponding to the particular electrical load is operated to disconnect the electric circuit in which the semiconductor relay is disposed. Thus, the particular electrical load is ensured not to be broken.

Alternative to the semiconductor relays, mechanically operated relays, fuses, fusible links, and the like may be used. For example, the electrical loads 16 to 18 may be a direct-injection injector, a steering-force-regulation motor provided at an electrically-driven power steering (EPS), a cam-by-wire motor provided at a cam-by-wire system that makes a cam of an engine operate in a beltless manner, and a braking-force-regulation motor provided at an electrically-driven braking system that controls braking of the vehicle by regulating the braking force.

According to the vehicle power system of the second embodiment, the advantages as set forth below are obtained.

(1) Use of the vehicle power system of the second embodiment enables integration of the power circuits of a plurality of electrical loads. Accordingly, the power circuits can be omitted from the respective electrical loads to thereby reduce the size and weight of the electrical loads.

(2) When the output current from the power distributor 15 to a particular electrical load is abnormal, the electric circuit for the abnormal output current is disconnected. For example, disconnection of the electrical circuit can prevent the breakage of the particular electrical load, which would have otherwise been caused by the abnormal output current. In addition, owing to the disconnection, the vehicle system as a whole is unlikely to be shut down due, for example, to the malfunction of the particular electrical load or to jammed harness.

(3) Since the operation power of the electrical loads 16 to 18 is generated by the switching power supply 14, power loss is reduced compared to the use of a series power supply. As a result, the load of the generator 1 is reduced and thus fuel consumption is improved. In addition, supply of high voltage is cut off, which would be caused when, for example, a battery is disconnected or when an engine is jump-started in cold climates by serially connecting a plurality of batteries. Thus, the electrical loads 16 to 18 are allowed to have lower withstand voltage which is lower by an amount equivalent to the cutoff of the supply of high voltage, thereby reducing the size and weight of each of the electrical loads.

(4) The power distributor 10 is able to directly distribute and supply the original power of 14 V to the electrical loads 11 to 13. Specifically, the power circuits of the electrical loads 11 to 13 can be integrated into a single component. Thus, since power circuits are not required to be provided to the respective electrical loads 11 to 13, the size and weight of the electrical loads 11 to 13 can be reduced by that much.

(5) The electrical loads 16 to 18 are driven by the operation power of high voltage supplied from the switching power supply 14. Thus, current that flows through the individual electrical loads can be made smaller than in the case where the electrical loads are driven by the operation power of low voltage. In addition, the cost that would have incurred in providing a drive circuit can be omitted. Also, the diameter of a harness that passes drive current can be made small.

(Third Embodiment)

Figure 3:
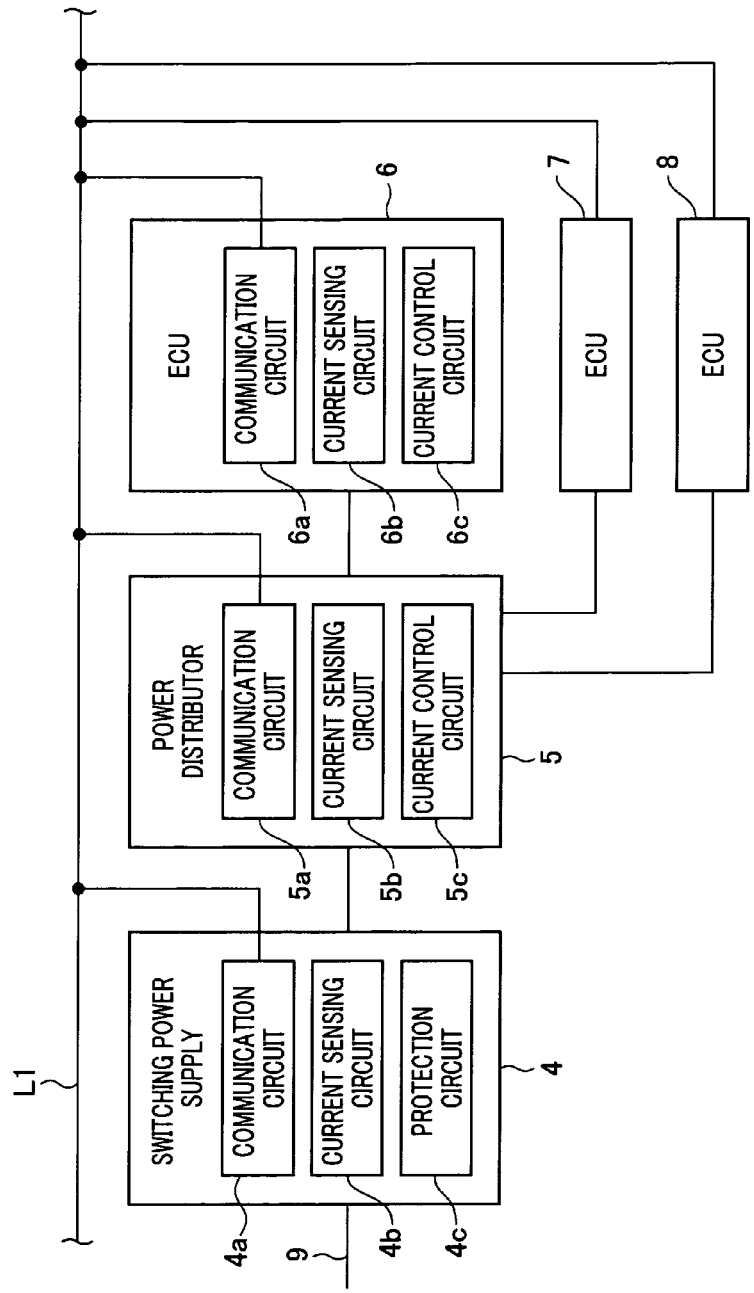
FIG. 3 is a block diagram illustrating a principal configuration of a vehicle power system according to a third embodiment of the present disclosure.

Referring now to FIG. 3, a third embodiment of the present disclosure is described. FIG. 3 is a block diagram illustrating a principal configuration of a vehicle power system according to the third embodiment.

In the present embodiment, the switching power supply 4 includes a communication circuit 4a, a current sensing circuit 4b and a protection circuit 4c. The power distributor 5 includes a communication circuit 5a, a current sensing circuit 5b and a current control circuit 5c. The ECU 6 includes a communication circuit 6a, a current sensing circuit 6b and a current control circuit 6c. The communication circuits 4a, 5a and 6a are connected with each other via an in-vehicle communication line L1. The communication circuits perform multiplex communication via the in-vehicle communication line L1 according to the LVDS (low-voltage differential signaling) standard. Each of the communication circuits includes a driver and a receiver based on the LVDS standard as well as a microcomputer that controls communication. The ECUs 7 and 8 each have the same configuration and function as those of the ECU 6.

The current sensing circuit 4b senses the magnitude of the output current outputted by the switching power supply 4 to the power distributor 5 (hereinafter referred to as "first output current value"). The current sensing circuit 5b senses the magnitude of the output current outputted by the power distributor 5 to the ECUs 6 to 8 (hereinafter referred to as "second output current value"). The current sensing circuit 6b senses the magnitude of consumption current (hereinafter referred to as "consumption current value") of the ECU 6.

The communication circuit 4a transmits the first output current value sensed by the current sensing circuit 4b to other communication circuits 5a and 6a via the in-vehicle communication line L1. The communication circuit 5a transmits the second output current value sensed by the current sensing circuit 5b to other communication circuits 4a and 6a via the in-vehicle communication line L1. The communication circuit 6a transmits the consumption current value sensed by the current sensing circuit 6b to other communication circuits 4a and 5a via the in-vehicle communication line L1.

The communication circuit 4a receives the second output current value transmitted from the communication circuit 5a via the communication line L1 and the consumption current value transmitted from the communication circuit 6a via the communication line L1, for storage in a storage medium such as RAM configuring the microcomputer of the communication circuit 4a. The communication circuit 5a receives the first output current value transmitted from the communication circuit 4a via the communication line L1 and the consumption current value transmitted from the communication circuit 6a via the communication line L1, for storage in a storage medium such as RAM configuring the microcomputer of the communication circuit 5a.

The communication circuit 6a receives the first output current value transmitted from the communication circuit 4a via the communication line L1 and the second output current value transmitted from the communication circuit 5a via the communication line L1, for storage in a storage medium such as RAM configuring the microcomputer of the communication circuit 6a. In other words, the communication circuits 4a, 5a and 6a share the output current values and the consumption current value transmitted from other communication circuits via the communication line L1.

The protection circuit 4c protects the switching power supply 4 such as from over-current. The current control circuit 5c determines whether or not the first output current value received by the communication circuit 5a exceeds a third threshold. If yes, the current control circuit 5c effects control so that the output current of the power distributor 5 is made small according to the degree of exceeding the third threshold.

The current control circuit 6c determines whether or not the first output current value received by the communication circuit 6a exceeds a fifth threshold. If yes, the current control circuit 6c effects control so that the consumption current of the ECU 6 is made small according to the degree of exceeding the fifth threshold. Also, the current control circuit 6c determines whether or not the second output current value received by the communication circuit 6a exceeds a sixth threshold. If yes, the current control circuit 6c effects control so that the consumption current of the ECU 6 is made small according to the degree of exceeding the sixth threshold.

In other words, the vehicle power system of the present embodiment effects control so that current is made small if there is alienation between the current values of the switching power supply 4, the power distributor 5 and the ECUs 6 to 8. If the output current outputted to a particular ECU from the power distributor 5 becomes abnormal (e.g., if the wire harness through which the output current passes is jammed into the vehicle body and an abrupt increase of current value has been sensed) while the output current in question is in the process of being controlled to a lower level, the semiconductor relay connected to the particular ECU is operated to stop the output of the output current to the particular ECU.

According to the vehicle power system of the third embodiment, the advantages as set forth below are obtained.

(1) Use of the vehicle power system according to the third embodiment enables control under which the output currents of the switching power supply 4 and the power distributor 5 as well as the consumption currents of the ECUs 6 to 8 are allowed not to exceed the thresholds. Specifically, the current values are managed so that objects to be controlled by the ECUs will not be broken and that systems of the vehicle will not be shut down.

(2) Also, once the output current supplied from the power distributor 5 to a particular ECU becomes abnormal, the abnormal output current is stopped, irrespective of the fact that the output current is in the process of being controlled to a lower level.

Thus, for example, breakage of the particular ECU is prevented, which would have otherwise been caused by the abnormal output current.

(3) Further, owing to the high speed (e.g., 64 Mbps) communication of the current values based on the LVDS standard, the communication circuits can perform real-time control of the output current and the consumption current.

(Fourth Embodiment)

Figure 4:
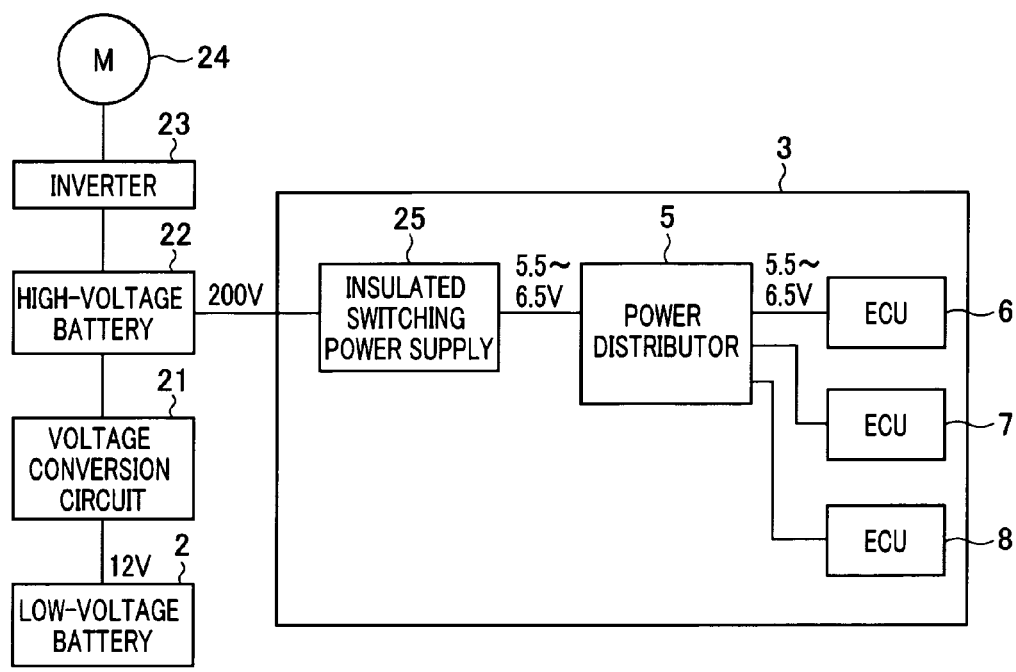
FIG. 4 is a block diagram illustrating a principal configuration of a vehicle power system according to a fourth embodiment of the present disclosure.

Referring to FIG. 4, hereinafter is described a fourth embodiment of the present disclosure. FIG. 4 is a block diagram illustrating a principal configuration of a vehicle power system according to the fourth embodiment.

The vehicle power system according to the fourth embodiment is installed in a hybrid vehicle using an internal combustion engine and an electric motor as drive sources of travel, or installed in an electric vehicle. The vehicle power system of the present embodiment includes a high-voltage battery 22, a low-voltage battery 2, an inverter 23, a voltage conversion circuit 21 and an electric motor 24.

The high-voltage battery 22 has an open-circuit voltage of 200 V and the low-voltage battery 2 has an open-circuit voltage of 12 V. The batteries 22 and 2 are connected by the voltage conversion circuit 21. High-voltage power supplied from the high-voltage battery 22 is converted into low voltage by the voltage conversion circuit 21 to charge the low-voltage battery 2. The high-voltage battery 22 is connected to the electric motor 24 for travel via the inverter 23. The DC power supplied from the high-voltage battery 22 is converted into AC power by the inverter 23 for supply to the electric motor 24. The electric motor 24 charges the high-voltage battery 22 via the inverter 23. Specifically, the electric motor 24 also functions as a generator.

The housing 3 of the present embodiment includes an insulated switching power supply 25, as well as the power distributor 5 and the ECUs 6 to 8. The insulated switching power supply 25 has a power input connected to the high-voltage battery 22. When a battery having high open-circuit voltage, such as the high-voltage battery 22, is used, the chassis ground of the vehicle cannot be used. For this reason, such an insulated switching power supply is used. For example, the insulated switching power supply may be a known DC/DC converter. The insulated switching power supply 25 has a power output connected to the power input of the power distributor 5. The power outputs of the power distributor are connected to the power inputs of the respective ECUs 6 to 8.

The DC power of 200 V supplied from the high-voltage battery 22 is stepped down by the insulated switching power supply 25 to a DC power of 5.5 to 6.5 V for supply to the power distributor 5. The power distributor 5 supplies the DC power of 5.5 to 6.5 V to the ECUs 6 to 8.

The vehicle power system according to the fourth embodiment uses an insulated switching power supply as a switching power supply and thus can be applied to a vehicle installing a high-voltage battery. Excepting the use of an insulated switching power supply as a switching power supply, the vehicle power system of the present embodiment has the same configuration as that of the first embodiment. Thus, the present embodiment can enjoy the same advantages as those of the first embodiment.

(Fifth Embodiment)

Figure 5:
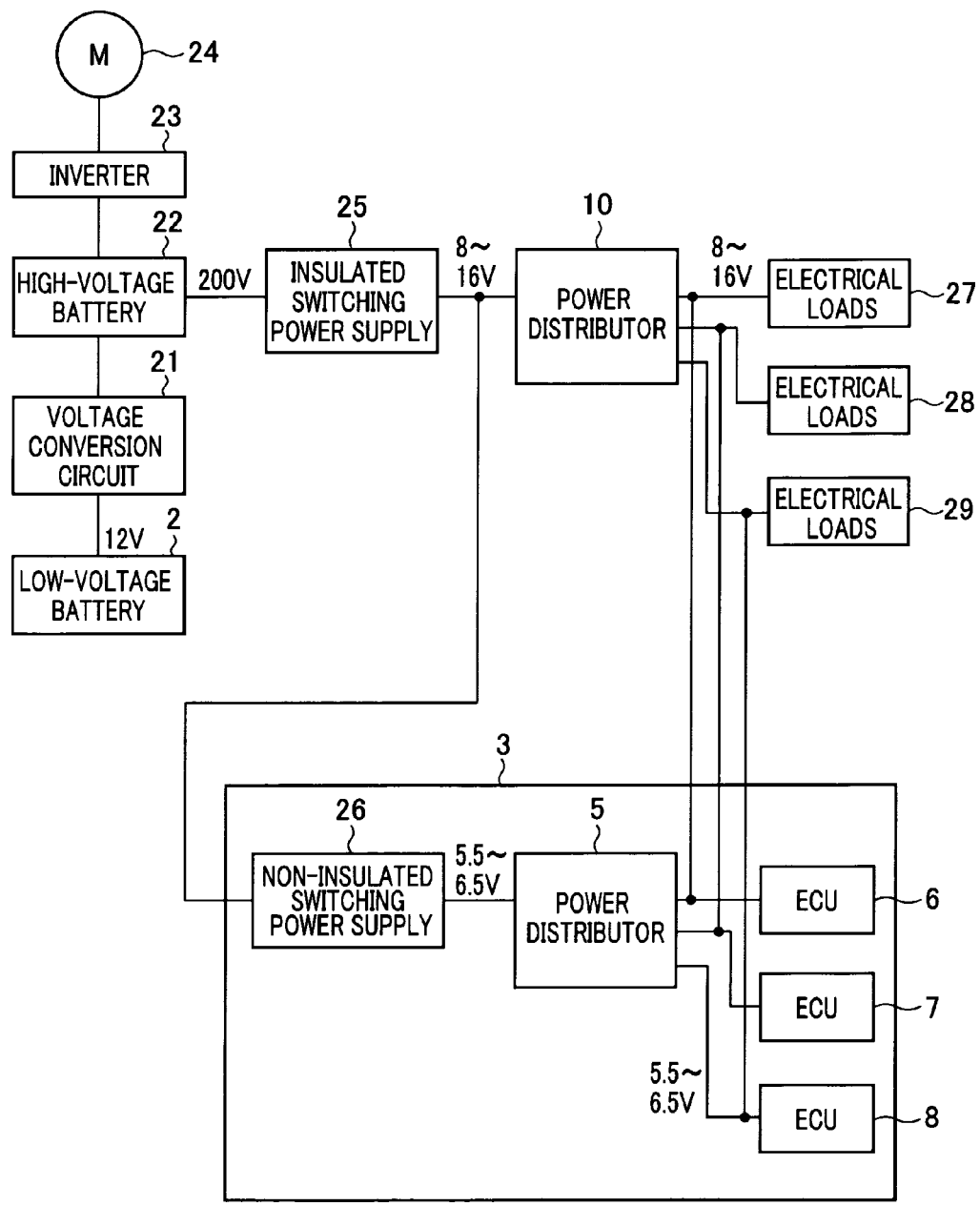
FIG. 5 is a block diagram illustrating a principal configuration of a vehicle power system according to a fifth embodiment of the present disclosure.

Referring to FIG. 5, hereinafter is described a fifth embodiment of the present disclosure. FIG. 5 is a block diagram illustrating a principal configuration of a vehicle power system according to the fifth embodiment.

The vehicle power system according to the fifth embodiment includes a non-insulated switching power supply 26, a power distributor 10 and electrical loads 27 to 29 in addition to the components of the fourth embodiment. The housing 3 of the present embodiment includes the non-insulated switching power supply 26, the power distributor 5 and the ECUs 6 to 7.

The power input of the insulated switching power supply 25 is connected to the high-voltage 22, while the power output thereof is connected to a power input of the non-insulated switching power supply 26. The insulated switching power supply 25 steps down the DC power of 200 V supplied from the high-voltage battery 22 to a DC power of 8 to 16 V for supply to the power distributor 10. The power distributor 10 distributes and supplies the DC power of 8 to 16 V to the electrical loads 27 to 29 which are driven at 8 to 16 V. For example, the electrical loads 27 to may be occupant crash protection devices, such as airbags, or may be sensors.

The non-insulated switching power supply 26 steps down the DC power of 8 to 16 V supplied from the insulated switching power supply 25 to generate a DC power of 5.5 to 6.5 V for supply to the power distributor 5. The power distributor 5 distributes and supplies the DC power of 5.5 to 6.5 V to the ECUs 6 to 8. For example, the non-insulated switching power supply 26 may be a known DC/DC converter.

In the vehicle power system according to the fifth embodiment, the operation power is supplied from the non-insulated switching power supply 26 to the ECUs 6 to 8. Therefore, the size of the power supply can be more reduced than in the case where operation power is supplied from an insulated switching power supply. In addition, the cost incurred in providing the power circuit is reduced.

In the case where the electrical loads to which operation power is supplied from the non-insulated switching power supply 26 are operated at 18 to 42 V, a non-insulated switching power supply that generates power of 18 to 42 V may be used as the non-insulated switching power supply 26. Use of this configuration can reduce the power loss of a power supply that supplies operation power to the electrical loads. As a result, the diameter of a wire harness for supplying power is reduced.

For example, the electrical loads driven at 18 to 42 V may be a steering-force-regulation motor provided at an electrically-driven power steering (EPS). Motors of this type are mostly only driven during a short time. Therefore, use of a non-insulated switching power supply can help configuring a power circuit of a small size at low cost.

(Sixth Embodiment)

Figure 6:
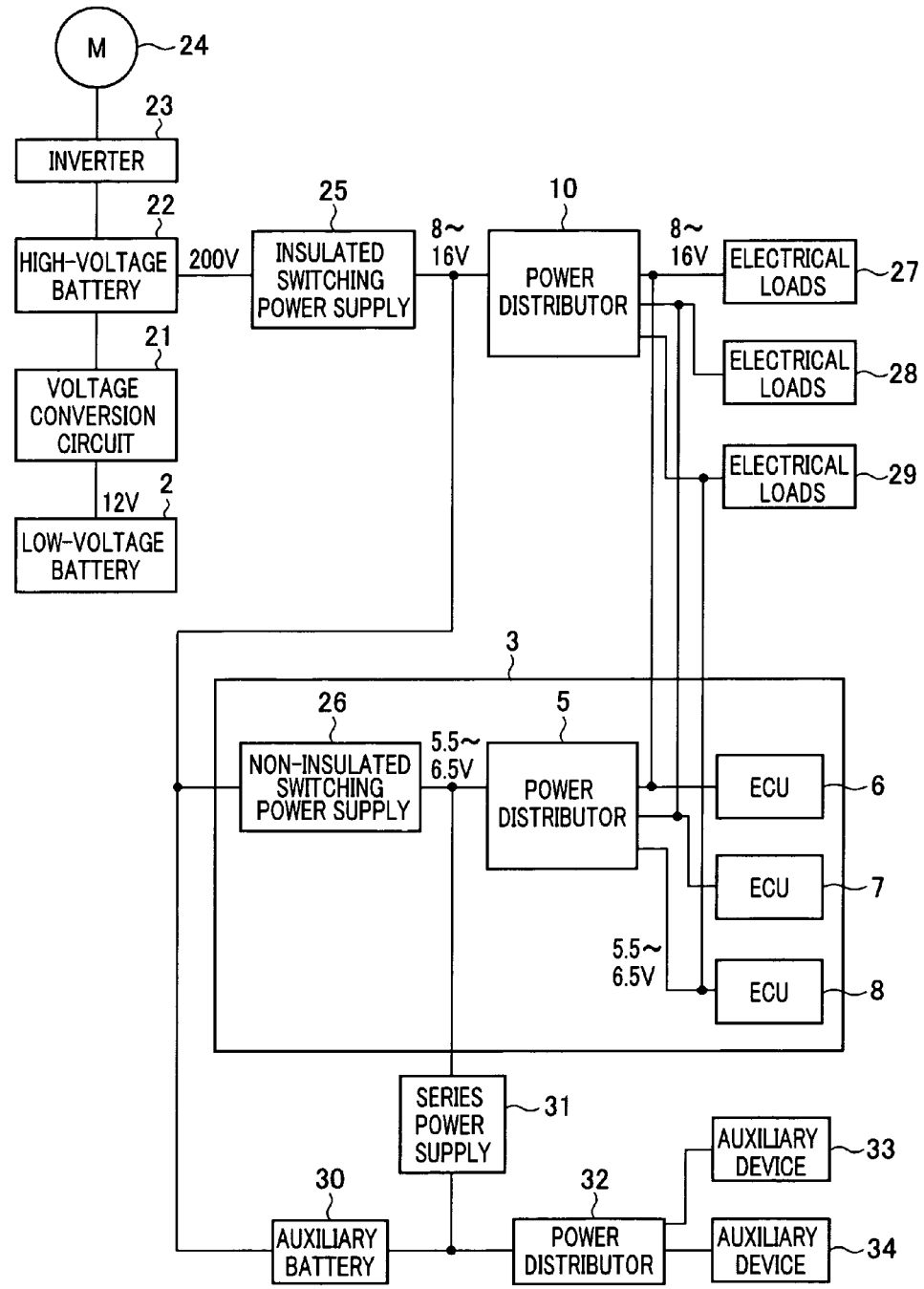
FIG. 6 is a block diagram illustrating a principal configuration of a vehicle power system according to a sixth embodiment of the present disclosure.

Referring to FIG. 6, hereinafter is described a sixth embodiment of the present disclosure. FIG. 6 is a block diagram illustrating a principal configuration of a vehicle power system according to the sixth embodiment.

In the present sixth embodiment, only the parts different from those of the fifth embodiment are explained. The vehicle power system according to the sixth embodiment includes a battery 30 for auxiliary devices (hereinafter referred to as "auxiliary battery 30"), a series power supply 31, a power distributor 32 and auxiliary devices 33 and 34, in addition to the components of the fifth embodiment.

The power output of the insulated switching power supply 25 is connected to a power input of the auxiliary battery 30. The auxiliary battery 30 is connected to the series power supply 31 which operates with the auxiliary battery 30 as being a primary side. The series power supply 31 has a power output connected to the power input of the power distributor 5. The auxiliary battery 30 has a power output connected to a power input of the power distributor 32. The power distributor 32 has power outputs connected to power inputs of the respective auxiliary devices 33 and 34.

The auxiliary devices here refer to those various machines, such as an air conditioner and an electrically-drive power steering, which are required to be driven during the operation of the vehicle but are not directly associated with the output of motive power for traveling. The series power supply 31 is charged by the auxiliary battery 30. The series power supply 31 supplies the operation power of 5.5 to 6.5 V to the power distributor 5 when charging of the high-voltage battery 22 is stopped. The power distributor 5 supplies the operation power to the ECUs 6 to 8.

According to the vehicle power system of the sixth embodiment, the advantages as set forth below are obtained.

(1) The vehicle power system of the sixth embodiment, if it uses the high-voltage battery 22, allows the auxiliary battery 30, which is connected to the output side of the insulated switching power supply 25, to supply power to the auxiliary devices 33 and 34.

(2) Owing to the use of the series power supply 31, the ECUs 6 to 8 are supplied with operation power, irrespective of the establishment of a so-called "sleep mode" where supply of power from the high-voltage battery 22 is stopped. Thus, a security system and an automatic door-lock system, for example, provided in the vehicle are maintained in an operable state.

(3) The auxiliary battery 30 is able to charge the series power supply 31. Thus, the high-voltage battery 22 is prevented from being consumed by the possible operation of a particular ECU while the charge of the high-voltage battery 22 is stopped.

(Seventh Embodiment)

Figure 7:
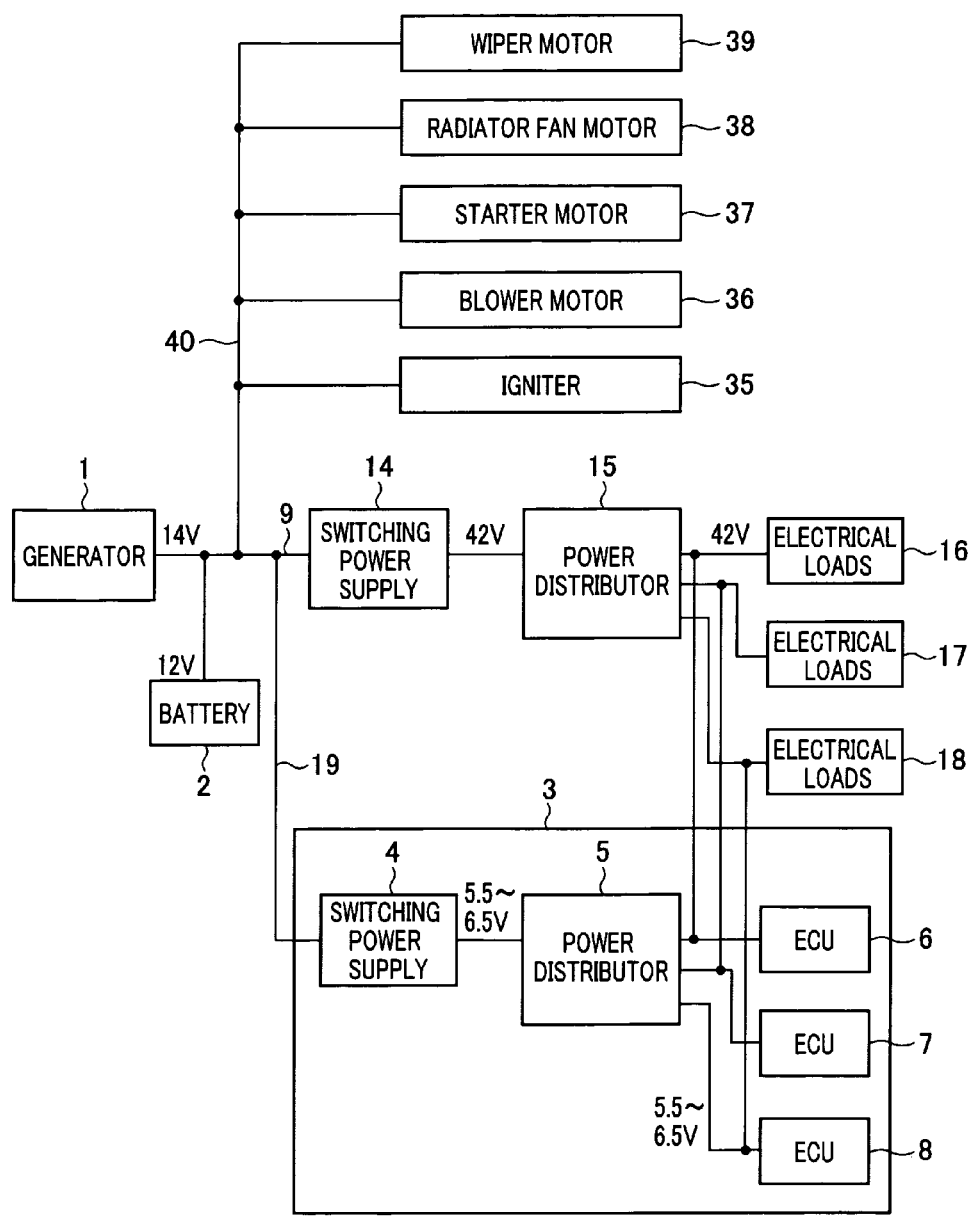
FIG. 7 is a block diagram illustrating principal configuration of a vehicle power system according to a seventh embodiment of the present disclosure.

Referring to FIG. 7, hereinafter is described a seventh embodiment of the present disclosure. FIG. 7 is a block diagram illustrating a principal configuration of a vehicle power system according to the seventh embodiment.

The vehicle power system of the seventh embodiment includes an igniter 35, a blower motor 36 for rotating a blower fan of an air conditioner, a starter motor 37, a radiator fan motor 3 for rotating a radiator fan, a wiper motor 39 for driving wipers, and a power line 40, in addition to the components described in the above embodiments.

The power line 9 through which power is supplied from the generator 1 and the battery 2 is connected to the power input of the switching power supply 14. The power output of the switching power supply 14 is connected to the power input of the power distributor 15, while the power outputs of the power distributor 15 are connected to the respective electrical loads 16 to 18. The power line 40 through which power is supplied from the generator 1 and the battery 2 is connected to the igniter 35 for sparking and discharging an ignition plug of an engine.

Further, the power line 40 is also connected to the blower motor 36, the starter motor 37, the radiator fan motor 38, and the wiper motor 39. The igniter 35, the blower motor 36, the starter motor 37, the radiator fan motor 38 and the wiper motor 39 connected to the power line 40 are electrical loads that cause comparatively larger noise than the electrical loads (ECUs) 6 to 8 and the electrical loads 16 to 18 to which operation power is supplied from the switching power supplies 4 and 14. Specifically, the power line for the electrical loads whose noise level is large is separated from the power line for the electrical loads whose noise level is small.

Using the vehicle power system according to the seventh embodiment, the noise caused by the electrical loads whose noise level is large is barely allowed to enter the power line for the electrical loads whose noise level is small.

(Modifications)

(1) The communication based on the LVDS standard of the third embodiment described above may be replaced by the communication using CAN® (controller area network) as a communication protocol. Use of CAN® enables communication at a speed of 500 Kbps or more. Therefore, output current and consumption current can be controlled on a real-time basis. Also, the communication using CAN enhances noise immunity more than in the case of using a single-end process, thereby enabling communication of high speed and of low power consumption.

(2) A lithium-ion battery may be used instead of the battery 2. Using such a lithium-ion battery whose internal resistance is low, the original power of low noise level can be supplied to a power supply.

(3) The sixth embodiment described above has had a configuration in which the series power supply 31 is charged from the auxiliary battery 30. Alternative to this, the series power supply may be charged by a different battery. Also, a switching power supply may be used alternative to the series power supply.

(4) Desirably, in order to ensure safety of the system, a power circuit for realizing the originally-purposed function of the system may be separated from a power supply for performing diagnosis. Also, a circuit may be required, with which consumption current is reduced in a so-called "sleep mode" that is the state where the vehicle is not in a traveling state. To cope with this, power circuits for supplying operation power to a plurality of ECUs may be assembled into a plurality of switching power supplies rather than integrating into a single switching power supply. Then, for example, one of the pluralities of switching power supplies may be set as the power circuit for realizing the originally-purposed function of the system and a different one of the switching power supplies may be set as the power supply for use in the "sleep mode".

(5) The third embodiment described above has a configuration in which multiplex communication is performed between the switching power supply 4, the power distributor 5 and the ECUs 6 to 8. Alternative to this, multiplex communication may be performed only between the switching power supply 4 and the power distributor 5, or only between the power distributor 5 and the ECUs 6 to 8, or only between the switching power supply 4 and the ECUs 6 to 8.

What is claimed is:

1. A vehicle power system comprising:
a generator driven by an engine for generating electricity; and
a battery charged by the generator; wherein,
the vehicle power system supplies power to various electrical loads installed in the vehicle from at least either one of the generator and the battery;
the vehicle power system further comprising:
a first power generating unit that generates a first operation power for operating a plurality of ECUs as first electrical loads by stepping down an original power supplied from at least either one of the generator and the battery;
a first power distributor that distributes and supplies a first operation power generated by the first power generating unit to individual ECUs;
a first current sensing circuit and first communication circuit provided in the power generating unit;
a second current sensing circuit, a second communication circuit, and a first current control circuit provided in the first power distributor;
a third current sensing circuit, a third communication circuit, and a second current control circuit provided in the individual ECUs, respectively; and
a in-vehicle communication line that connects between the first, the second, and the third communication circuits; wherein,
the first current sensing circuit detects a first output current value that is a magnitude of an output current of the first power generating unit;
the second current sensing circuit detects a second output current value that is a magnitude of an output current of the first power distributor;
the third current sensing circuit detects a consumption current value that is a magnitude of a consumption current of the individual ECUs;
the first communication circuit transmits the first output current value detected by the first current sensing circuit via the in-vehicle communication line, and receives the second output current value transmitted by the second communication circuit and the consumption current value transmitted by the third communication circuit;
the second communication circuit transmits the second output current value detected by the second current sensing circuit via the in-vehicle communication line, and receives the first output current value transmitted by the first communication circuit and the consumption current value transmitted by the third communication circuit;
the third communication circuit transmits the consumption current value detected by the third current sensing circuit via the in-vehicle communication line, and receives the first output current value transmitted by the first communication circuit and the second output current value transmitted by the second communication circuit,
the first current control circuit controls the output current of the first power distributor to become small when the first output current value received by the second communication circuit exceeds a set threshold, and
the second current control circuit reduces the consumption current when at least one of the first output current value and the second output current value received by the third communication circuit exceeds a set threshold corresponding to each value.

2. The vehicle power system according to claim 1, wherein, the first power distributor provides individual ECUs a shut-off circuit that disconnects an electric circuit outputting the output current when the output current to the particular ECU becomes abnormal.

3. The vehicle power system according to claim 1, wherein, the first power distributor provides individual ECUs a shut-off circuit that disconnects an electric circuit outputting the output current when the output current to the particular ECU becomes abnormal, and the first power distributor is configured to disconnect the output current to the particular ECU by operating the shut-off circuit connected to the particular ECU when the output current to the particular ECU becomes abnormal even when the second current control circuit controls the second output current to become small.

4. The vehicle power system according to claim 1, wherein, a communication speed of the in-vehicle communication line is 500 Kbps or more.

5. The vehicle power system according to claim 4, wherein, a communication using the in-vehicle communication line is performed based on the communication standard called LVDS (low-voltage differential signaling).

6. The vehicle power system according to claim 1, wherein, the first power generating unit is a switching power supply.

7. The vehicle power system according to claim 6, wherein, the switching power supply is an insulated switching power supply.

8. The vehicle power system according to claim 6, wherein the switching power supply is a non-insulated switching power supply.

9. The vehicle power system according to claim 1, wherein, the first power generating unit generates the first operation power of 5.5 to 6.5V.

10. The vehicle power system according to claim 1, the vehicle power system further comprising:
   a second power generating unit that generates a second operation power to operate a plurality of second electrical loads by stepping up an original power, and
   a second power distributor that distributes and supplies the second operation power generated by the second power generating unit to each second electrical load.

11. The vehicle power system according to claim 10, wherein,
   the second power generating unit is an insulated switching power supply,
   the first power generating unit is a non-insulated switching power supply that has the first insulated switching power supply as a primary power supply, and
   the first power distributor distributes and supplies the first operation power generated by the non-insulated switching power supply to the individual ECUs.

12. The vehicle power system according to claim 1, the vehicle power system further comprising:
   a series power supply that supplies an operation power to a microcomputer installed in the particular ECU while a battery charge is stopped.

13. The vehicle power system according to claim 10, wherein,
   the second power generating unit is an insulated switching power supply,
   the vehicle power system is provided with a battery for auxiliary devices, which is connected to an output side of the insulated switching power supply, for operating auxiliary devices, and a series power supply having the first battery for the auxiliary devices as a primary side that supplies an operation power to a microcomputer installed in the particular ECU when the generator is not driven.

14. The vehicle power system according to claim 10, wherein,
   the second power generating unit is a switching power supply.

15. The vehicle power system according to claim 14, wherein,
   the switching power supply is an insulated switching power supply.

16. The vehicle power system according to claim 14, wherein,
   the switching power supply is a non-insulated switching power supply.

17. The vehicle power system according to claim 10, wherein,
   the second power generating unit generates the second operation power of 8 to 16V.

18. The vehicle power system according to claim 10, wherein,
   the second power generating unit generates the second operation power of 18 to 42V.

19. The vehicle power system according to claim 1, the vehicle power system further comprising:
   a third power distributor that distributes and supplies the original power directly to a plurality of third electrical loads.

20. The vehicle power system according to claim 1, wherein,
   an open-circuit voltage of the battery is 100 V or more.

21. The vehicle power system according to claim 1, wherein,
   the vehicle power system is constituted with the power line for the electrical loads whose noise level is large is separated from the power line for the electrical loads whose noise level is small, and
   the original power is supplied directly to the power line for the electrical loads whose noise level is large.

22. The vehicle power system according to claim 21, wherein,
   the electrical loads whose noise level is large includes at least one of an igniter, a starter motor, a blower motor for rotating a blower fan of an air conditioner, a wiper motor for driving wipers, and a radiator fan motor for rotating a radiator fan.

23. The vehicle power system according to claim 1, wherein,
   the battery is a lithium-ion battery.

24. The vehicle power system according to claim 1, wherein,
   the first power generating unit and the first power distributor are accommodated in a case where a plurality of the ECUs are accommodated.

* * * * *